United States Patent [19]

Martner

[11] Patent Number: 4,468,680

[45] Date of Patent: Aug. 28, 1984

[54] ARRAYED INK JET APPARATUS

[75] Inventor: John G. Martner, Brookfield, Conn.

[73] Assignee: Exxon Research and Engineering Co., Florham Park, N.J.

[21] Appl. No.: 380,080

[22] Filed: May 20, 1982

Related U.S. Application Data

[63] Continuation-in-part of Ser. No. 229,992, Jan. 30, 1981, abandoned.

[51] Int. Cl.$^3$ .......... G01D 15/18

[52] U.S. Cl. .......... 346/140 R; 310/328

[58] Field of Search .......... 346/140; 310/323, 328, 310/369; 400/126

[56] References Cited

U.S. PATENT DOCUMENTS

| | | | |
|---|---|---|---|
| 2,512,743 | 6/1950 | Hansell | 346/140 |
| 3,546,498 | 12/1970 | McMaster | 310/323 |
| 4,005,435 | 1/1977 | Lundquist | 346/75 X |
| 4,046,073 | 9/1977 | Mitchell | 346/1.1 X |
| 4,272,200 | 6/1981 | Hehl | 400/126 X |
| 4,290,074 | 9/1981 | Royer | 346/75 |
| 4,308,547 | 12/1981 | Lovelady | 346/140 |

OTHER PUBLICATIONS

Mitchell et al., Ink on Demand Printing . . . and Electrostatic Control; IBM JDB, vol. 18, No. 2, Jul. 1975, pp. 608-609.

*Primary Examiner*—Joseph W. Hartary
*Attorney, Agent, or Firm*—Kenneth Watov

[57] ABSTRACT

An elongated acoustic waveguide 20 couples a transducer 18 to an ink jet chamber 14 including an inlet port 26,65 and an outlet orifice 16 through which droplets of ink are ejected. In one embodiment, the waveguide 20 is directly coupled to ink within the chamber 14. In another embodiment, the waveguide 20 is coupled to ink within the chamber through a diaphragm 60. Arrays are formed utilizing such ink jet chambers 14 and waveguides 20.

39 Claims, 16 Drawing Figures

ARRAYED INK JET APPARATUS

RELATED APPLICATIONS

This application is a continuation-in-part of application Ser. No. 229,992, filed Jan. 30, 1981, and abandoned.

BACKGROUND OF THE INVENTION

This invention relates to ink jets, more particularly, to ink jets adapted to eject a droplet of ink from an orifice for purposes of marking on a copy medium.

It is desirable in certain circumstances to provide an array of ink jets for writing alpha-numeric characters. For this purpose, it is frequently desirable to provide a high density ink jet array. However, in many instances, the stimulating element or transducers of such an array are sufficiently bulky so as to impose serious limitations on the density in which ink jets may be arrayed. In this connection, it will be appreciated that the transducers must typically comprise a certain finite size so as to provide the energy and displacements required to produce a change in ink jet chamber volume which results in the ejection of a droplet of ink from the orifice associated with the ink chamber.

It will also be appreciated that efforts to create a high density ink jet array may produce undesirable cross talk between the ink jets in the array. This is a result, at least at large part, of the relatively close spacing of ink jets in the array.

When efforts are made to achieve a high density array, the ink jet transducers become intimately associated with the fluidic section of the ink jet, i.e., the ink chambers and orifices. As a consequence, any failure in the fluidic section of the device, which is far more common than a failure of the transducer, necesitates the disposal of the entire apparatus, i.e., both the fluidic section and the transducer.

SUMMARY OF THE INVENTION

It is an object of this invention to provide a high density ink jet array.

It is a further object of this invention to provide an ink jet array to minimize cross talk between ink jets.

It is a still further object of this invention to provide an ink jet array which facilitates disposability of the fluidic channel section of the ink jets independently of the transducers of the ink jets.

It is a further object of this invention to provide a fluidic feeding system to the jets that minimize air entrapment and cavitation sites.

It is a further object of this invention to provide a waveguide array that is encapsulated in a suitable material to prevent generation of flexural vibration that can cause cross talk to neighboring fluidic feeding channels.

In accordance with these and other objects of the invention, an ink jet apparatus comprises an ink jet chamber including an inlet port for receiving ink in the chamber and an outlet orifice for ejecting ink droplets from the chamber. A transducer is remotely located from the chamber and an elongated either solid or tubular acoustic waveguide is coupled between the ink jet chamber and the transducer. The acoustic waveguide transmits acoustic pulses generated at the transducer to the chamber for changing the volume of the chamber in response to the state of energization of the transducer.

In accordance with this invention, acoustic pulses are transmitted along the waveguide in the following manner. When the transducer is energized, the ends thereof move in an axial direction in an amount determined by the voltage applied to the transducer. If one end of said transducer is affixed to a solid back piece, the other end will move against the abutted end of the waveguide. The abutted end of the waveguide will then be driven along in the same direction by an amount corresponding to that of the end of the transducer. If the driving pulse (voltage) is sharp, e.g., the voltage takes a short time to reach its final value, the end of the transducer will move fast; the end of the waveguide will move accordingly fast, and only part of said waveguide will be able to follow the fast motion. The rest of the waveguide will stay at rest. The end of the waveguide that was initially deformed will relax by pushing and elastically deforming consecutive portions along the waveguide. This successive displacement of the elastic deformation ultimately reaches the distal end of the waveguide. The last portion thereof causes the fluid within the chamber to be compressed and thus causes the ejection of fluid droplets from the nozzle orifice. The physical properties used in this invention are those of a true wave traveling along the waveguide length and not those of a push rod whereby when one end of the rod is moved, the other end will move in unison.

In accordance with one aspect of the invention, a plurality of such ink jets are utilized in an array such that the spacing from center to center of transducers is substantially greater than the spacing from axis to axis of the orifices. This relative spacing of transducers as compared with orifices is accomplished by converging the acoustic waveguide toward the orifices.

In accordance with another object of this invention, all of the transducers are located at one side of the axis of the orifice at one extremity of the array.

In accordance with another aspect of the invention, the waveguides are of differing lengths along the axes of elongation.

In accordance with another aspect of the invention, the waveguides can be tapered so that their diameter at the distal ends are substantially smaller than those at the transducer ends. This tapering of the waveguides provides yet closer spacing between the waveguides, thus further increasing the channel density. Alternatively, in applications where such channel density is not required, the waveguides can have a uniform cross sectional area from end to end or be tapered in either direction.

In accordance with yet another important aspect of the invention, the distal ends of the waveguides are made of tubular material to provide a fluid feed channel to thus maintain the chambers filled with fluid.

In accordance with yet another aspect of the invention, the fluid feed channels are provided with an orifice at the distal end having a cross-sectional area smaller than the cross-sectional area of said fluid channel so as to serve as a restrictor to control the flow of fluid passing therethrough.

In accordance with yet another aspect of the invention, the chambers of the ink jets may include a diaphragm coupled to the waveguide such that the diaphragm contracts and expands in response to the state of energization of the transducer in a direction having at least a component parallel with the axis of the orifice.

In accordance with yet still another aspect of the invention, each waveguide abutts the transducer and is held thereon by means of a metal or ceramic ferrule that fits both the transducer end and the waveguide end.

In accordance with another aspect of the invention, each acoustic waveguide is elongated such that the overall length along the axis of elongation greatly exceeds the dimension of the waveguide transverse to the axis.

Figure 1:
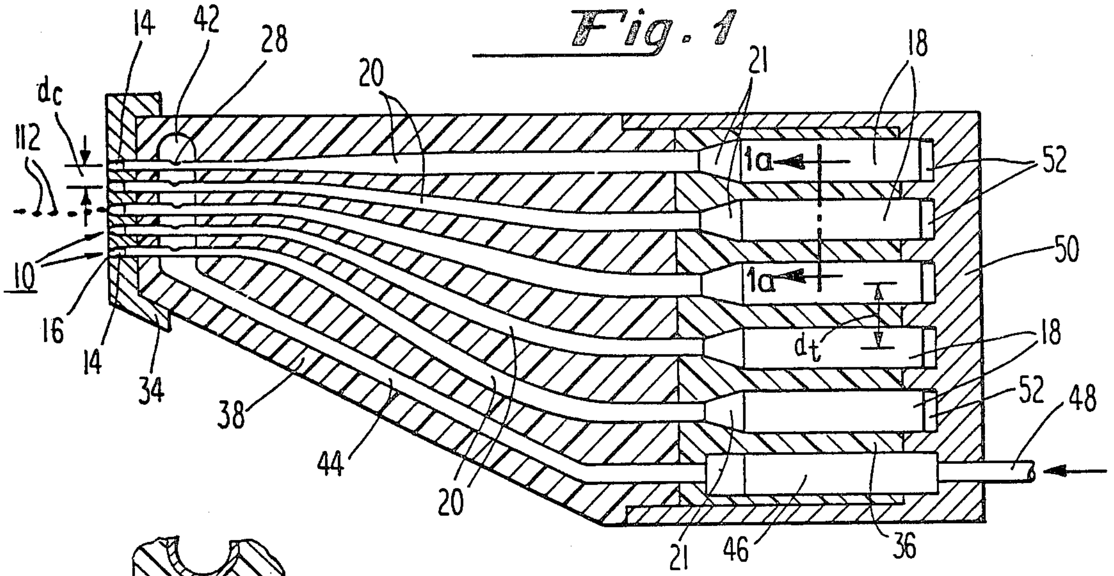
FIG. 1 is a sectional view of an ink jet array representing a preferred embodiment of the invention.
Figure 2B:
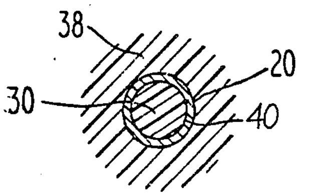
Figure 2A:
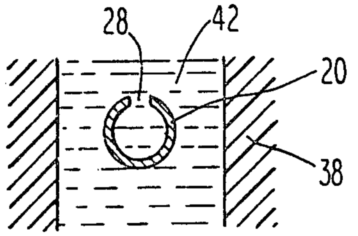
Figure 2:
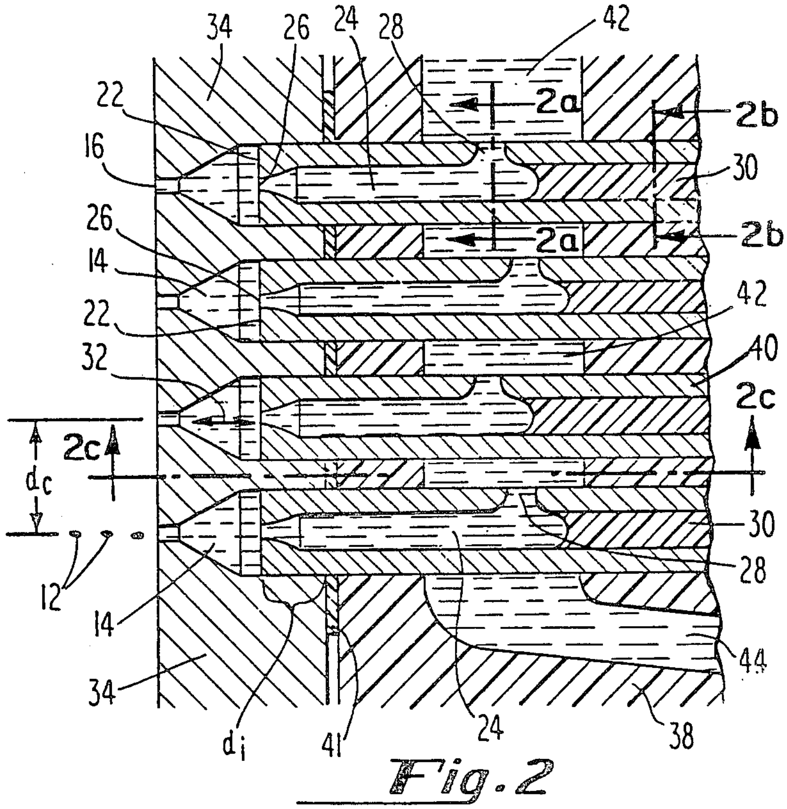
Figure 2C:
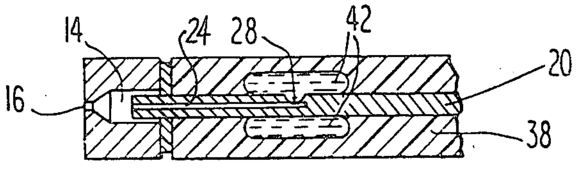
Figure 3:
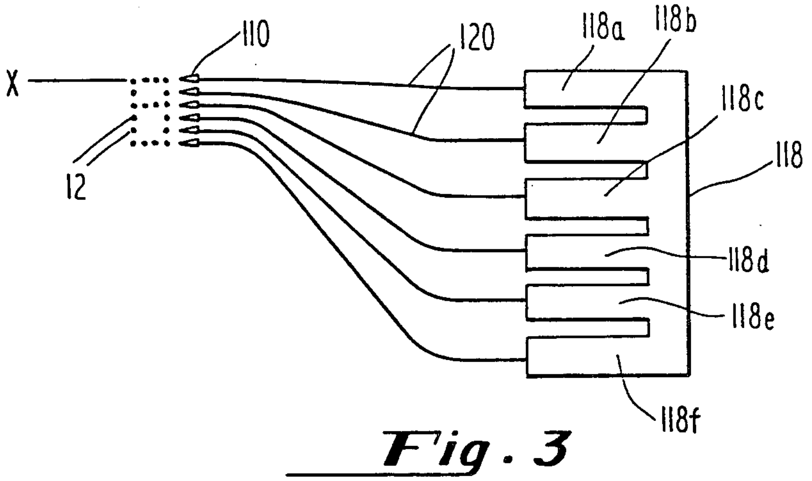
Figure 4:
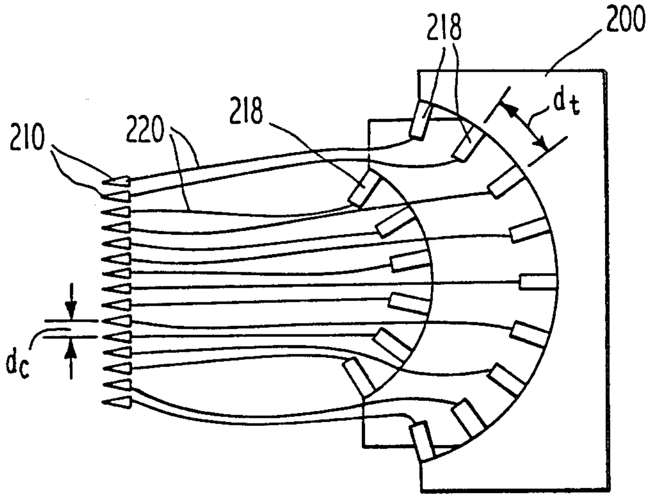
Figure 5:
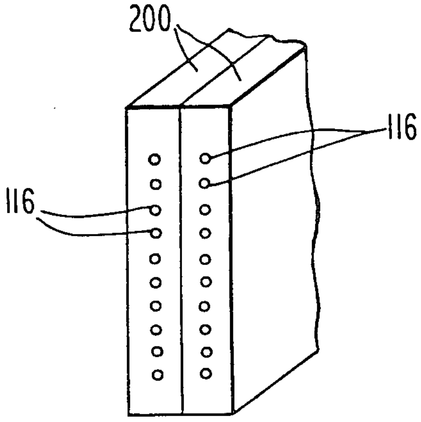
Figure 6:
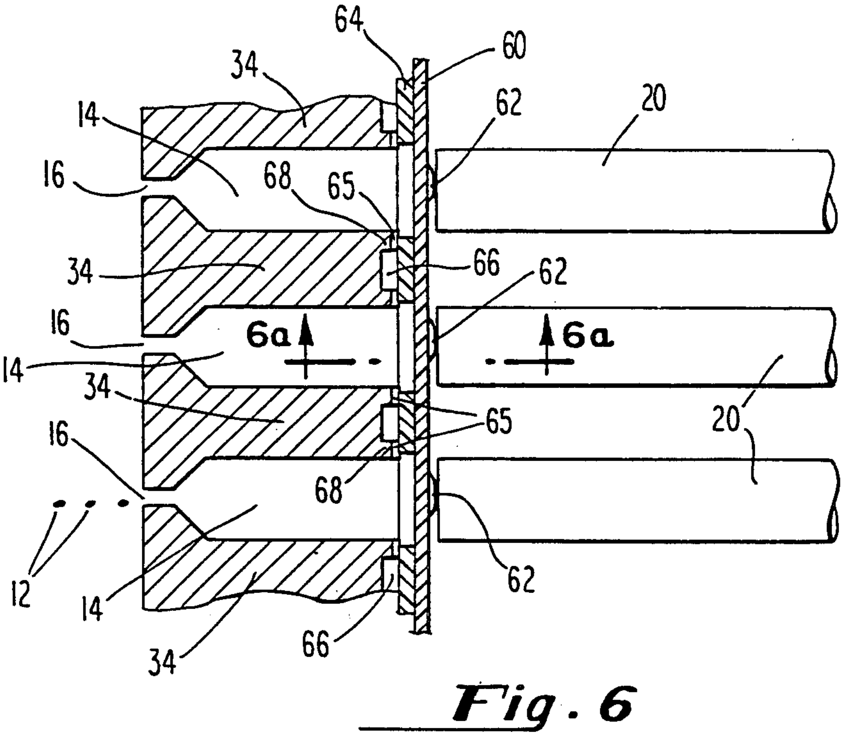
Figure 7:
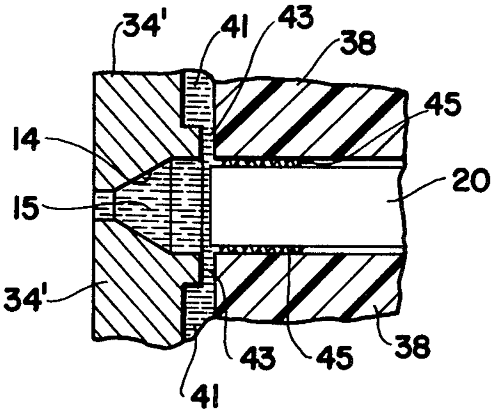
Figure 8:
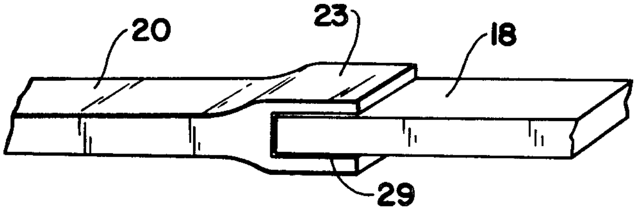
Figure 9:
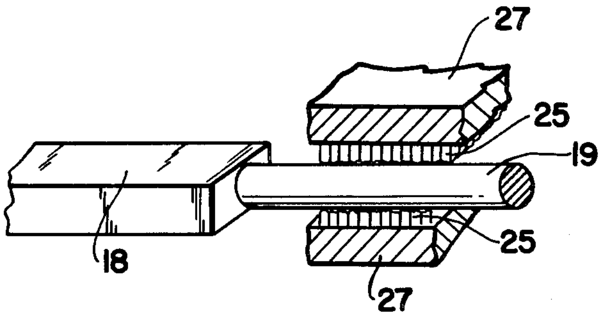
Figure 10:
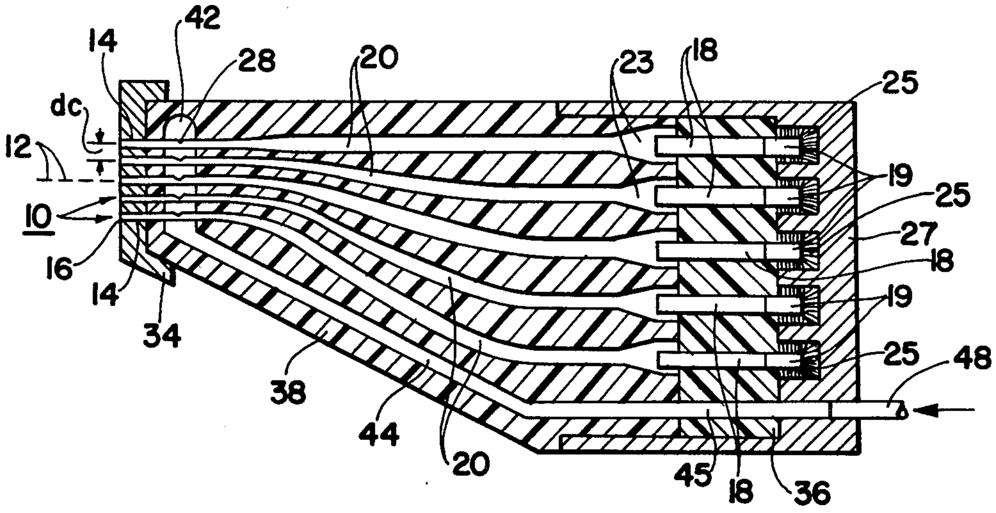
Figure 11:
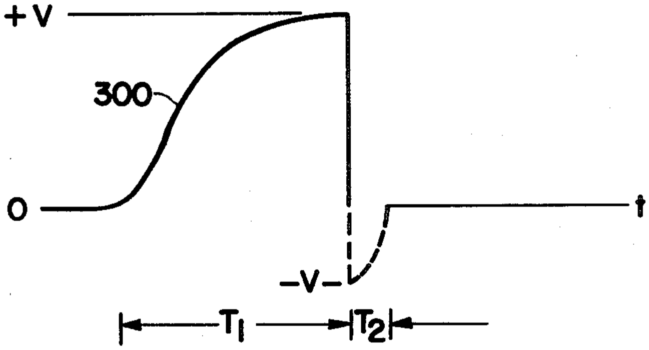

FIG. *1a* is a sectional view taken along line *1a*—*1a* of FIG. 1;

FIG. 2 is a partially enlarged view of the array shown in FIG. 1;

FIG. *2a* is a sectional view taken along line *2a*—*2a* of FIG. 2;

FIG. *2b* is a sectional view taken along line *2b*—*2b* of FIG. 2;

FIG. *2c* is a sectional view taken along line *2c*—*2c* of FIG. 2;

FIG. 3 is a partially schematic diagram of yet another embodiment of the invention;

FIG. 4 is a partially schematic diagram of still another embodiment of the invention;

FIG. 5 is a partially schematic diagram of still another embodiment of the invention;

FIG. 6 is a sectional view of another embodiment of the invention;

FIG. *6a* is a sectional view taken along line *6a*—*6a* of FIG. 6;

FIG. 7 is a sectional view of another embodiment of the invention;

FIG. 8 is an isometric view of an alternative embodiment of the invention for attaching the waveguides to the transducers;

FIG. 9 is an isometric view of an alternative embodiment of the invention for attaching the waveguides to the cap or back body of the ink jet array;

FIG. 10 is a sectional view of the ink jet array incorporating the embodiments of FIGS. 8 and 9; and FIG. 11 is a preferred waveform for driving the transducers of the ink jet array.

DETAILED DESCRIPTION OF PREFERRED EMBODIMENT

Referring to FIG. 1, an ink jet array comprising a plurality of jets 10 are arranged in a line so as to asynchronously eject ink droplets 12 on demand. The jets 10 comprise chambers 14 having outlet orifices 16 from which the droplets 12 are ejected. In accordance with this invention, the chambers expand and contract in response to the state of energization of transducers 18, which are coupled to the chambers 14 by acoustic waveguides 20. In further accordance with this invention, the waveguides 20 may actually be substantially inserted into said chamber by a distance $d_i$ as shown in FIG. 2.

In further accordance with this invention, the use of the waveguides 20 which are coupled to the transducer 18 by a ceramic or metal ferrule 21 so as to permit the jets 10 to be more closely spaced without imposing limitations on the spacing of the transducers 18. More particularly, the centers of the chambers may be spaced by a distance $d_c$ which is substantially less than the distance between the centers of the transducers $d_t$. This allows the creation of a dense ink jet array regardless of the configuration or size of the transducers 18. In the preferred embodiment, the transducers 18 have a rectangular or square cross section. The dimensions for rectangular transducers 18 are typically 0.01 inch thick, 0.06 to 0.08 inch wide, and about 0.75 inch long.

In accordance with this invention, acoustic pulses are transmitted along the waveguide 20 in the following manner. When the transducer 18 is energized, the ends thereof move in an axial direction, i.e., the direction parallel with the axis of elongation of the waveguide 20, in an amount determined by the voltage applied to the transducer 18. Since one end of the transducer 18 is affixed to a solid back piece, the other end will move against the abutting end of the waveguide 20. The abutting end of the waveguide 20 will then be driven in the same direction by an amount corresponding to the end of the transducer 18. If the driving pulse is sharp, e.g., the voltage takes a short time to reach its final value, the end of the transducer will move fast in a similar manner, and only part of the waveguide 20 will be able to follow the fast motion. The rest of the waveguide will stay at rest. The end of the waveguide that was initially deformed will relax by pushing an elastically deforming consecutive portion along the waveguides 20. This successive displacement of the elastic deformation ultimately reaches the distal end of the waveguide 20. The last portion thereof causes the fluid within the chamber 14 to be compressed and thus causes the ejection of fluid droplets from the orifice. The physical properties used in this invention are those of a true waveguide traveling along the waveguide length and not those of a piston whereby one end of the rod is moved and the other end will move in unison.

In accordance with one important aspect of this invention, the chambers 14 are coupled to a passageway 24 in the waveguide 20 which is terminated at the distal end 22 by an opening 26. The opening 26 is of a reduced cross-sectional area as compared with the cross-sectional area of the waveguide a greater distance from the orifice 16 (i.e., the passageway tapers) so as to provide a restrictor at the inlet to the chamber 14. It is preferred that the cross-sectional area of opening 26 at the inlet to the chamber 14 be made slightly larger than the cross-section of the orifice 16, to minimize the backflow of fluid from chamber 14 to passageway 24. In this manner maximum compressional energy is delivered to chamber 14 during elongation of the waveguide 20 for ejecting a droplet 12 from orifice 16 at maximum velocity. Ink enters the passageway 24 in the waveguide 20 through an opening 28, as shown in FIGS. 2, *2a* and *2c*. The remainder of the waveguide 20 may be filled with a suitable material 30 such as a metal piece or epoxy encapsulant.

During the operation of the ink jet array as shown in FIGS. 1 and 2, the distal end 22 of the waveguide 20 expands and contracts the volume of the chamber 14 in a direction 32 having at least a component parallel with the axis of the orifice 16. It will, of course, be appreciated that the waveguides 20 necessarily extend in a direction having at least component parallel with the direction of the expansion and contraction of the ends 22 of the waveguides 20.

It will be appreciated that the waveguides 20 as shown in FIG. 1 are elongated. As utilized herein, the waveguides 20 are considered elongated as long as the overall length along the axis of acoustic propagation greatly exceeds the dimension of the waveguide transverse to the axis, e.g., more than 10 times greater.

As shown in FIG. 1, the waveguides 20 actually penetrate into the chambers 14. The position of the waveguides 20 in the chambers 14 may be preserved by maintaining a close tolerance between the external dimension of the waveguides 20 and the walls of the chamber 14 is formed in a block 34. The block 34 may comprise a variety of materials including plastics, metals and/or ceramics.

Figure 1A:
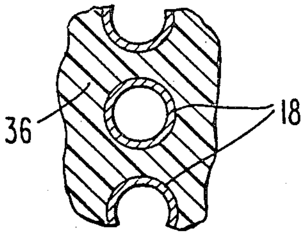

Referring again to FIG. 1 in combination with FIG. 1*a,* it will be appreciated that the transducers 18 are potted within a potting material 36 which may comprise elastomers or foams. The waveguides 20 are also encapsulated or potted within a material 38 as shown in FIGS. 1 and 2. As also shown in FIG. 2*b,* each waveguide 20 may be surrounded by a sleeve 40, which assists in attenuating flexural vibrations or resonances in the waveguide 20. In the alternative, sleeve 40 may be eliminated and the potting material 38 may be relied upon to attenuate resonances. A suitable potting material 38 includes elastomers, polyethylene or polystyrene. The potting material 38 is separated from the chamber block 34 by a gasket 41 which may comprise an elastomer.

It will, of course, be appreciated that the transducers 18 must be energized in order to transmit an acoustic pulse along the waveguides 20. Although no leads have been shown as coupled to the transducers 18, it will be appreciated that such leads will be provided for energization of the transducers 18. It is also important to note that the present ink jet array operates nonresonantly.

By referring now to FIGS. 1 and 2, it will be appreciated that ink flows through the inlet ports 28 in each of the waveguides 20 from a chamber 42 which communicates through a channel 44 to a pump 46. The pump 46 which may be of the type disclosed in U.S. Pat. No. 4,389,657, issued June 21, 1983, incorporated herein by reference, supplied ink under the appropriate regulated pressure from a supply 48 to the chamber 42. The pressure regulation afforded by the pump 46 is important, particularly in a typewriter environment, since considerable liquid sloshing and accompanying changes in liquid pressure within the chamber 42 and a passageway 44 may occur. As shown in FIG. 1, the end of the ink jet array is capped by a member 50 which covers foot members 52 at the ends of the transducers 22 as well as the end of the pump 46.

As shown in FIG. 1, some of the waveguides 20 individually extend in a substantially straight line to the respective chambers 14. Others may be bent or curved toward the chambers 14. As shown in FIG. 3, a somewhat different transducer construction is utilized. More particularly, an integral transducer 118 having a plurality of legs 118(*a–f*) coupled to, for example, five jets 110 of the type shown in FIG. 1 through waveguides 120. The configuration of the transducer block 118 is immaterial so far as the density of the array of ink jets is concerned. Moreover, the disposition of the array of ink jets 110 may be changed vis-a-vis the transducer block 118. As shown, all of the transducers 118(*a–f*) are located at one side (shown as below) the axis x through the orifice of the jet 110 located at one extremity (shown as the upper extremity) of the array. As shown in FIG. 3 and in FIG. 1, the ink jet arrays are well suited for use in a printer application requiring last character visibility because of the skewing of the transducers to one side of the array of jets 10. Referring now to FIG. 4, a plurality of transducers 218 and jets 210 are mounted on a two-tiered head 200. Once again, the jets 210 are very closely spaced so as to achieve a dense array while the transducers 218 are more substantially spaced. As a result, the waveguides 220 fan in or converge from the transducers 218 to the jets 210. FIG. 5 shows an arrangement whereby two or more heads 200 shown in FIG. 4 are sandwiched together to thus form heads that have multiple rows of jets 210 with the purpose of multiplying the writing capability of the heads and thereby increasing the resolution of the characters generated.

As clearly shown in FIGS. 1, 3 and 4, the overall lengths of the waveguides vary. This allows the distance between the transducers to be maximized so as to minimize cross talk between transducers as well as between waveguides.

Figure 6A:
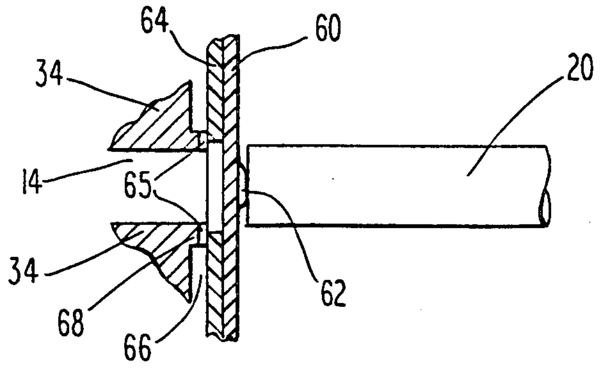

Referring now to FIGS. 6 and 6*a,* a somewhat different embodiment is shown wherein the acoustic waveguides 20 are coupled to the chambers 14 in a somewhat different manner. In particular, the ends of the chambers 14 remote from the orifices 16 are terminated by a diaphragm 60 including protrusions 62 which abut the waveguides 20. Ink is capable of flowing into the chambers 14 through orifices 65 shown in FIG. 6*a* adjacent a restrictor plate 64 of the type disclosed in copending application Ser. No. 336,603 filed Jan. 4, 1982, which is incorporated herein by reference. The openings 65 communicate with a reservoir 66 in the manner disclosed in the aforesaid application. For this purpose, the block 34 includes lands 68 which form the restrictor openings 65 to the chamber 14 in combination with the restrictor plate 64.

In operation, the pulse from a transducer travels along each of the waveguides 20 in the embodiment shown in FIG. 6 until such time as it reaches a projection 62 on the diaphram 60. This deforms the diaphram 60 into and out of the chamber 14 associated with that particular waveguide 20 so as to change the volume of that chamber and expell droplets of ink 12 from the orifices 16. It will, therefore, be appreciated that the diaphram 60 expands and contracts in a direction generally corresponding to and parallel with the axis of elongation of the waveguides 20 at the projection 62. It will be appreciated that the fluidic reaction of this embodiment including the chamber 14 may be reparable from the waveguides 20 at the diaphram 62 in accordance with one important object of the invention.

Acoustic waveguides suitable for use in the various embodiments of this invention include waveguides made of such material as tungsten, stainless steel or titanium, or other hard materials such as ceramics, or glass fibers. In choosing an acoustic waveguide, it is particularly important that the transmissibility of the waveguide material be a maximum for acoustic waves and its strength also be a maximum.

The mechanism by which the waveguides operate in conjunction with the transducer may be described as follows. An electrical pulse arrives at the transducer. The transducer first retracts (fill cycle) in response to the pulse, and then expands upon termination of the pulse. The retraction, followed by expansion results in displacements at the transducer face, which are imposed at the end of the waveguide which is touching the transducer. Assuming the rise-time of the pulse is long compared with the typical 2 microseconds propagation time of the waveguide, the waveguide will be pulled back by the contracting transducer, causing the volume of the chamber to be expanded. This permits fluid to enter or fill the increment of expansion of the chamber. Upon termination of the pulse, the transducer expands and generates a compressional pulse that travels along the waveguide with a speed equal to the speed of sound in the material of the waveguide. At a later time (corresponding to approximately 2 microseconds in a 2.54 cm steel guide, for example), the compressional pulse will arive at the distal end of the waveguide; thereby contracting the volume of the chamber for generating a droplet.

The physical mechanism involved in converting the pulse generated by the transducer into a mechanical pulse may be explained using a unit step excitation analysis or a unit impulse excitation analysis as follows:

UNIT STEP EXCITATION

Here, a constant force $F_o$, is assumed to be applied suddenly at time=0 to a waveguide that is at rest initially. The usual equation of motion is:

$$m\frac{d^2x}{dt^2} + c\frac{dx}{dt} + kx = Fo \text{ for } t > o$$

with the solution of:

$$x = \frac{Fo}{K} + Xe - \beta\, Wnt \sin(\sqrt{1-\beta^2}\, Wnt + \phi).$$

This must satisfy the initial conditions X=dx/dt=0 at t=0

$$tg\,\phi = \frac{\sqrt{1-\beta^2}}{\beta} \text{ and } X = -\frac{Fo}{k\sqrt{1-\beta^2}}$$

Then:

$$\therefore x = \frac{Fo}{k}\left[1 - \frac{e^{-\beta Wnt}}{\sqrt{1-\beta^2}}\sin(\sqrt{1-\beta^2}\, Wnt + \phi)\right].$$

Here:
$Wn$ = frequency of the transient ($W = 2\pi f$).

$\beta$ = damping factor (lossiness).

$t$ = time (sec)

$Fo$ = force applied (impulse) in dynes $m$ = mass (gr).

$k$ = spring constant assuming the guide deformation remains within the elastic limit of the material.

$k = \frac{EA}{l}$ where: $E$ = Young's Modulus in $\frac{(dy)}{cm^2}$ $A$ = cross section area in ($cm^2$)

$l$ = length in (cm).

also, $\frac{C}{2m} = \beta Wn$, where $C$ is the damping.

UNIT IMPULSE EXCITATION

An impulse, I, is defined as a large force acting for a very short time which can never be rigorously realized in practice. However, it is useful to assume this case because it provides insight into the understanding of waveguide operation. Thus, as stated: lim $I/\Delta t \rightarrow \infty$ as $\Delta t \rightarrow 0$.

This impulse produces an initial velocity in the small short portion mass (m) adjacent to the transducer end. This velocity is $v_o = I/m$, and the displacement may be considered equal to zero. Thus, the differential equation for t>0 with the right side equal to 0 the solution:

$$x = Xe^{-\beta Wnt}\sin[(\sqrt{1-\beta^2}\, Wnt) - \phi] \text{ is fitted to:}$$

$$\frac{dx}{dt} = \frac{I}{m} \text{ (at } t = o\text{) and } x = o$$

Then:

$$x = \frac{I}{\sqrt{Km(1-\beta^2)}} \text{ for } \phi = 0$$

Thus, the displacement, x, at any time, t, is:

$$x = \frac{I}{\sqrt{Km(1-\beta^2)}}\, e^{-\beta Wnt}\sin\sqrt{1-\beta^2}\, Wnt$$

with peak displacement given by:

$$tg(1 - \beta^2 Wnt) = \frac{\sqrt{1-\beta^2}}{\beta}$$

The kinetic energy provided by unit impulse on the first end of the waveguide is derived as follows:

An impulse, I, from the transducer hits the portion of mass in the waveguide and generates thereon a velocity, V. Assuming the waveguide had an initial velocity $V_o$, we have, for a velocity change:

$$m(V - V_o) = I$$

multiplying both sides by $\frac{1}{2}(V+V_o)$:

$$\tfrac{1}{2}mV^2 - \tfrac{1}{2}mV_o^2 = I[\tfrac{1}{2}(V - V_o)]$$

If no initial velocity is assumed ($V_o=0$), $\frac{1}{2}mV^2 = \frac{1}{2}IV$ = kinetic energy (in CGS units).

The foregoing is a general description of how a single (impulse) is introduced into a waveguide. In what follows, an analysis is made on what happens when an impulse travels along a waveguide.

When a mechanical impulse of amplitude, $\alpha$, travels along a waveguide medium, it will have a particle velocity $V_p$ at a time, t, and a displacement position, x. The displacement, b, at a time, t, of a particle whose initial position is, x, will be:

$$b = \alpha\sin 2\pi\left(\frac{t}{T} - \frac{x}{\lambda}\right) = \alpha\sin 2\pi\left(ft - \frac{x}{\lambda}\right)$$

Here:

T=period (sec)

f=frequency ($sec^{-1}$)

$\lambda$=wave length (impulse leading edge, pulse width, trailing edge)

$\alpha$=particle displacement amplitude.

Since:

$$v = f\lambda$$

and $$w = 2\pi f$$

Then:

$$b = a\sin\frac{2}{\lambda}(Vt - X) = a\sin w\left(t - \frac{x}{v}\right)$$

The particle velocity is:

$$\frac{db}{dt} = aw\cos w\left(t - \frac{x}{v}\right)$$

Assuming a large layer of thickness, dx, whose mass is dx (where $\rho$=density). The kinetic energy (KE) of this layer is:

$$dE = \frac{\rho dx}{2}\ \frac{db}{dt}\ 2 = \tfrac{1}{2}\rho dx a^2 w^2 \cos^2 w\left(t - \frac{x}{v}\right)$$

The KE of the whole wave system is:

$$E = \tfrac{1}{2}\rho a^2 w^2 \int \cos^2 w\left(t - \frac{x}{v}\right) dx$$

The total energy of the impulse motion per unit volume is:

$$E = \tfrac{1}{2}\rho a^2 w^2 (=\text{energy density}) = 2\pi^2 \rho^2 a^2 f^2$$

Thus, in thin wires, one gets large displacements and the energy is transmittable if it stays within the wire.

The intensity of the pulse is: I=energy transmission per second per unit area of wave front. Then it equals energy density E×velocity V.

$$I = \tfrac{1}{2}\rho a^2 w^2 v = a^2 w^2 (\rho v)$$

The varying compressional pressure P at any point relates to particle velocity in the medium as follows:

$$P = \rho v \frac{db}{dt} \therefore \frac{P}{\left(\frac{db}{dt}\right)} = \rho v = K \text{ (constant, depending on the material)}$$

The energy loss from the guide into the environment is calculated by:

$$R = \frac{R_2 - R_1}{R_2 + R_1} = 1 - \frac{4R_1 - R_2}{(R_1 + R_2)^2} \qquad (13)$$

Making $R_1 = P_1 C_1$ where $P_1$=density of the waveguide material in (gr/cm$^3$) and $C_1$=wave velocity in said material.

For steel: $R_1 = P_1 C_1 = 7.9 \times 5.2 \times 10^5 = 4.1 \times 10^6$.

For air: $P_2 C_2 = 0.35 \times 10^5$.

Hence, $1 - R = 0.0169$.

which is the amount lost from the waveguide per unit length and which is quite small.

The energy attenuation due to bending is calculated by A. E. H. Love in his *Treatise on the Mathematical Theory of Elasticity:* Dover (1944). From this calculation, it may be concluded that all of the energy would be transmitted along a bent waveguide if the bending radius is equal to or greater than a quarter wave of the vibrating power for the material of the waveguide.

In FIG. 7, an alternative embodiment for the "head end" of the ink jet array is shown for a single ink jet. The waveguides 20 are solid between their associated transducer 18 and ink chambers 14, and can be fabricated as shown in FIG. 2*b* and previously described. At the distal ends of the waveguides 20, an elastomer seal 45 (RTV or silicon rubber, for example) is used to prevent ink 15 from leaking from the chambers 14 to the areas between the waveguides 20 and potting material 38. Ink is delivered to the ink chambers 14 via restrictor like passageways 43. The restrictor passageways are fed ink 15 via supply chambers 41 located between individual jets of the array. Crosstalk between the chambers 14 is substantially reduced via the use of the restrictive passageways 43. Note that by necessity, the cap 34' is different from the cap 34 of FIG. 1.

In FIG. 8, an alternative embodiment for attaching a waveguide 20 to a transducer 18 is shown. The ends 23 of the waveguides 20 are configured as spade-like receptacles for receiving a portion of one end of the transducers 18. An adhesive 29, such as RTV or silicone elastomer material, or equivalent material is used to bond the transducers 18 to the waveguides 20, as shown.

An alternative embodiment for securing the other ends of the transducers 18 to a backplane 27 of the ink jet array is shown in FIG. 9. The other end 18 of a transducer is secured via a compensating rod 19 (matched in density to the transducer 18) to the backplane 27. The rod 19 can be attached to the transducer 18 via an elastomer adhesive, and in practice can also be countersunk into the end of the transducer 18 (this is not shown), for example.

In FIG. 10, an ink jet array of the present invention including the embodiments of FIGS. 8 and 9 is shown. The backplane 27 includes slots for receiving the compensating rods 19 and an elastomer adhesive 25. The adhesive 25 bonds the rods 19 to the backplane 27. Note that in this example the pump 46 has been eliminated. An ink passageway 45 replaces pump 46, in recognition of applications where gravity feed of the ink provides sufficient pressure. Note that resonances produced in operating the transducers 18 are reflected back into the compensating rods 19 and dampened within the rods 19, adhesive 25, and backplane 27. In this manner, undesirable resonances are substantially attenuated. It is important to attenuate resonances (ringing) and reflections in order to prevent meniscus instability, and the generation of satellite droplets when the ligament of an ink droplet ejected from an orifice is distended.

In the preferred mode of operation, the waveguides 20 operate primarily as push rods during a "fill" cycle, and as true waveguides during a "fire" cycle, as previously mentioned. The waveshape 300 of FIG. 11 has been discovered to provide better performance in operating the ink jet array, compared to other waveshapes tested by the inventor. Depending upon the design of the waveguides 20, and type of transducers 18, typical values for +V will range from +20 volts to +100 volts, for −V from −4 volts to −40 volts, for example. Also, the fill time $T_1$ is typically 60 microseconds, and $T_2$ is typically 10 microseconds. Note that it is preferred but not absolutely necessary to have the waveshape go negative (see phantom portion) during the firing cycle. When waveshape 300 is applied to one of the transducers 18, the transducer 18 contracts during period $T_1$ for the fill cycle, as previously explained. At the termination of $T_1$, the pulse 300 substantially steps back to zero volt or to −V, causing the transducer 18 to expand for ejecting an ink droplet 12 from the associated orifice 16.

As previously mentioned, in certain applications the waveguides 20 may have uniform cross section throughout. Their ends 23 which mate to the transducers 18 may be flared as shown and described for FIGS. 8 and 10. Other applications may require that the waveguides 20 taper at and near their distal ends, in order to ensure non-contact therebetween, but provide minimum practical spacing with reduced crosstalk. Note that the purpose of the tapering is wholly unlike the use of tapering in acoustic horns for obtaining amplification of acoustic signals transmitted through the horn.

Although the particular embodiments of the invention have been shown and described, it will occur to those with ordinary skill in the art that other modifications and embodiments exist as will fall within the true spirit and scope of the invention as set forth in the appending claims.

What is claimed is:

1. A drop-on-demand ink jet apparatus comprising:

an ink jet chamber including an inlet port for receiving ink in said chamber and an outlet orifice for ejecting ink droplets from said chamber;

a transducer remotely located from said chamber; and an acoustic waveguide coupled between said ink jet chamber and one end of said transducer for transmitting individual acoustic pulses generated at said transducer to said chamber for changing the volume of said chamber in response to the state of energization of said transducer, said inlet port comprising a hole in said waveguide for coupling ink from a reservoir to said chamber via a passageway included in said waveguide.

2. The ink jet apparatus of claim 1 wherein said chamber includes a diaphragm coupled to said waveguide, said diaphragm contracting and expanding in response to said state of energization.

3. The ink jet apparatus of claim 1 wherein said pulses are transmitted at said chamber in a direction having at least a component parallel with the axis of the orifice.

4. The ink jet apparatus of claim 1 wherein said waveguide extends in a direction having at least a component parallel with the axis of the orifice.

5. The ink jet apparatus of claim 1 wherein said waveguide is inserted substantially into said chamber.

6. The ink jet apparatus of claim 1 wherein said waveguide extends through said reservoir, said inlet port being located in an intermediate portion along the waveguide at said reservoir.

7. The ink jet apparatus of claim 1 wherein said passageway has a lesser cross-section over said orifice than at said inlet port.

8. The ink jet apparatus of claim 1 wherein said waveguide abutts the transducer.

9. The ink jet apparatus of claim 1, wherein said elongated transducer is energizable for contracting along its axis of elongation, for causing expansion of the volume of said chamber.

10. The ink jet apparatus of claim 1, wherein said elongated single transducer is energizable by application of a field transverse to the direction of expansion or contraction of said transducer.

11. The ink jet apparatus of claim 1, wherein said transducer is energizable via a drive pulse having an exponentially rising leading edge, and a step-like trailing edge.

12. The ink jet apparatus of claim 11, wherein said drive pulse trailing edge is permitted to step from a voltage of one polarity to a voltage of another polarity, and thereafter exponentially decay.

13. The ink jet apparatus of claim 1 wherein said acoustic waveguide is elongated such that the overall length along the axis of propagation substantially exceeds the dimension of said waveguide transverse to said axis.

14. The ink jet apparatus of claim 13 wherein said waveguide is curved along the axis of elongation.

15. The ink jet apparatus of claim 13 wherein said pulses are transmitted at said chamber in a direction having at least a component parallel with the axis of the orifice.

16. The ink jet apparatus of claim 13 wherein said waveguide extends in a direction having at least a component parallel with the axis of the orifice.

17. The ink jet apparatus of claim 13 wherein said waveguide extends through said reservoir, said inlet port being located in an intermediate portion along waveguide at said reservoir.

18. The ink jet apparatus of claim 13 wherein said passageway has a lower cross-section over said orifice than at said inlet port.

19. A drop-on-demand ink jet array comprising:

a plurality of ink jet chambers, each of said chambers including an inlet port for receiving ink in said chamber and an outlet orifice for ejecting ink droplets from said chamber;

a plurality of transducers remotely located from said chambers, respectively;

a plurality of acoustic waveguides coupled between said ink jet chambers and said transducers, respectively, for transmitting acoustic pulses generated at said transducers to said chambers for changing the volume of said chambers in response to the state of energization of said transducers, respectively, said inlet ports comprising a hole in respective waveguides for coupling ink from a reservoir to said chambers via passageways included in said waveguides, respectively.

20. The ink jet array of claim 19 wherein said waveguides are of differing lengths along their axis of elongation.

21. The ink jet array of claim 20 wherein said waveguides converge toward an array of said chambers.

22. The ink jet array of claim 21 wherein the maximum distance between said array of chambers is substantially less than the maximum distance between said transducers.

23. The ink jet array of claim 21 wherein all of said transducers are located at one side of the axis of an orifice at one extremity of said array.

24. The ink jet array of claim 19 wherein each of said chambers include a diaphragm coupled to said waveguide, said diaphragm contracting and expanding in response to said state of energization.

25. The ink jet array of claim 24 wherein said diaphragm expands and contracts in a direction having at least a component parallel with the axis of its associated orifice.

26. The ink jet array of claim 24 wherein said waveguide extends in a direction having at least a component in parallel with the direction of expansion and contraction of said diaphragm.

27. The ink jet array of claim 26 wherein said diaphragm expands and contracts in a direction having at least a component parallel with the axis of the orifice.

28. The ink jet apparatus of claim 19, wherein said plurality of elongated transducers are each energizeable for contracting along their axes of elongation, for causing expansion of the volume of said chambers, respectively.

29. The ink jet apparatus of claim 19, wherein said plurality of elongated transducers are each energizeable by application of a field transverse to the direction of expansion or contraction of said transducers.

30. The ink jet apparatus of claim 19, wherein said transducers are each energizable via drive pulses having exponential leading edges, and steplike trailing edges.

31. The ink jet apparatus of claim 30, wherein the trailing edges of said drive pulses are each permitted to step from one to another polarity of voltage, and thereafter to exponentially decay towards zero volt.

32. The ink jet array of claim 19 wherein each of said acoustic waveguides is elongated such that the overall length along the axes of propagation greatly exceeds the dimension of said waveguides transverse to said axis.

33. The ink jet array of claim 19 wherein said plurality of waveguides are removably coupled to said ink jet chambers.

34. A drop-on-demand ink jet apparatus comprising:

an ink jet chamber including an inlet port for receiving ink in said chamber and an outlet orifice for ejecting ink droplets from said chamber;

a transducer remotely located from said chamber;

an acoustic waveguide coupled between said ink jet chamber and one end of said transducer for transmitting individual acoustic pulses generated at said transducer to said chamber for changing the volume of said chamber in response to the state or energization of said transducer;

a backplane having a cup-like receptacle; and a compensating rod having one end rigidly connected to the other end of said transducer, the other end of said compensating rod being secured within said cup-like receptacle of said backplane.

35. The ink jet apparatus of claim 34, wherein the density of the material of said rod is matched to the density of the material of said transducer.

36. The ink jet apparatus of claims 34 or 35, wherein an elastomeric adhesive is used to secure said other end of said compensating rod to said backplane.

37. A drop-on-demand ink jet array comprising:

a plurality of ink jet chambers, each of said chambers including an inlet port for receiving ink in said chamber and an outlet orifice for ejecting ink droplets from said chamber;

a plurality of transducers remotely located from said chambers, respectively;

a plurality of acoustic waveguides coupled between said ink jet chambers and said transducers, respectively, for transmitting acoustic pulses generated at said transducers to said chambers for changing the volume of said chambers in response to the state of energization of said transducers, respectively;

a backplane having a plurality of cup-like receptacles; and a plurality of compensating rods having one end rigidly connected to the other ends of said transducers, respectively, the other ends of said compensating rods being secured within said cup-like receptacles, respectively, of said backplane.

38. The ink jet apparatus of claim 37, wherein the density of the material of said rods are matched to the density of the material of said transducers for maximizing the acoustic wave transfer therebetween, respectively.

39. The ink jet apparatus of claims 37 or 38, wherein an elastomeric adhesive is used to secure said other ends of said compensating rods to said backplane.

* * * * *